United States Patent
Enerson et al.

(10) Patent No.: US 12,544,540 B2
(45) Date of Patent: Feb. 10, 2026

(54) BRAID AND PULL WIRE CONTAINMENT RING FOR DEFLECTABLE GUIDING CATHETER

(71) Applicant: Oscor Inc., Palm Harbor, FL (US)

(72) Inventors: Andrew J. Enerson, New Port Richey, FL (US); Michael Mejia, Palm Harbor, FL (US); Thomas P. Osypka, Palm Harbor, FL (US)

(73) Assignee: Greatbatch Ltd., Clarence, NY (US)

( * ) Notice: Subject to any disclaimer, the term of this patent is extended or adjusted under 35 U.S.C. 154(b) by 1049 days.

(21) Appl. No.: 17/356,762

(22) Filed: Jun. 24, 2021

(65) Prior Publication Data

US 2021/0402147 A1 Dec. 30, 2021

Related U.S. Application Data

(60) Provisional application No. 63/043,827, filed on Jun. 25, 2020.

(51) Int. Cl.
*A61M 25/01* (2006.01)
*A61M 25/00* (2006.01)

(52) U.S. Cl.
CPC .... *A61M 25/0147* (2013.01); *A61M 25/0012* (2013.01); *A61M 25/005* (2013.01); *A61M 25/0144* (2013.01); *A61M 2025/015* (2013.01)

(58) Field of Classification Search
CPC ........ A61M 25/0147; A61M 2025/015; A61M 2025/0161
See application file for complete search history.

(56) References Cited

U.S. PATENT DOCUMENTS

| | | | | |
|---|---|---|---|---|
| 4,586,923 A | * | 5/1986 | Gould | A61M 25/0147 604/95.04 |
| 9,498,602 B2 | * | 11/2016 | Osypka | A61M 25/0136 |
| 9,572,957 B2 | * | 2/2017 | Osypka | A61M 25/0136 |
| 9,907,570 B2 | * | 3/2018 | Osypka | A61B 90/94 |
| 9,913,684 B2 | * | 3/2018 | Osypka | A61B 18/1492 |
| 11,235,126 B2 | * | 2/2022 | Brannick | A61M 25/0147 |
| 11,931,529 B2 | * | 3/2024 | King | A61M 25/0026 |
| 2004/0122360 A1 | * | 6/2004 | Waldhauser | A61M 25/005 264/234 |
| 2007/0270679 A1 | * | 11/2007 | Nguyen | A61M 25/0043 600/585 |
| 2007/0299493 A1 | * | 12/2007 | Osypka | A61N 1/0573 607/127 |

(Continued)

*Primary Examiner* — Laura A Bouchelle
*Assistant Examiner* — Adam J. Cermak
(74) *Attorney, Agent, or Firm* — Michael F. Scalise

(57) ABSTRACT

A deflectable guiding catheter that includes a proximal handle assembly, an elongated catheter shaft extending distally from the proximal handle assembly and including a deflectable distal end portion, a drive mechanism within the proximal handle assembly for steering the deflectable distal end portion of the catheter shaft, an anchor ring positioned adjacent a distal end of the catheter shaft, an elongated pull wire extending from the drive mechanism and connected to the anchor ring, a braided sleeve extending from a proximal end of the catheter shaft to a proximal end of the anchor ring, and a containment ring positioned over a distal end portion of the braided sleeve at the proximal end of the anchor ring.

20 Claims, 5 Drawing Sheets

(56) References Cited

U.S. PATENT DOCUMENTS

| | | | |
|---|---|---|---|
| 2009/0312698 A1* | 12/2009 | Farrell | A61M 25/0054 604/95.04 |
| 2010/0286756 A1* | 11/2010 | Dorn | A61M 25/0147 623/1.11 |
| 2012/0123327 A1* | 5/2012 | Miller | A61M 25/0136 604/95.04 |
| 2012/0203169 A1* | 8/2012 | Tegg | A61B 5/283 604/95.04 |
| 2013/0030363 A1* | 1/2013 | Wong | A61B 34/20 604/95.04 |
| 2013/0281925 A1* | 10/2013 | Benscoter | A61B 1/0125 604/95.04 |
| 2014/0005647 A1* | 1/2014 | Shuffler | A61M 25/0136 29/592.1 |
| 2015/0174363 A1* | 6/2015 | Sutermeister | A61M 25/005 604/95.04 |
| 2016/0029878 A1* | 2/2016 | Yamazaki | A61B 1/0057 600/149 |
| 2016/0279386 A1* | 9/2016 | Dale | A61M 25/0133 |
| 2017/0043129 A1* | 2/2017 | Fuentes | A61M 25/0147 |
| 2017/0136213 A1* | 5/2017 | Kauphusman | A61M 25/0012 |
| 2017/0258614 A1* | 9/2017 | Griffin | A61M 25/0147 |
| 2018/0021546 A1* | 1/2018 | McDermott | A61M 25/0147 604/95.04 |
| 2018/0229031 A1* | 8/2018 | Searfoss | A61L 31/024 |
| 2019/0357893 A1* | 11/2019 | Weber | A61B 17/00234 |
| 2020/0222667 A1* | 7/2020 | Tang | A61M 25/0147 |
| 2020/0269017 A1* | 8/2020 | Winston | A61F 2/2427 |
| 2021/0001088 A1* | 1/2021 | Brannick | A61M 25/0662 |
| 2021/0016056 A1* | 1/2021 | Drake | A61M 25/005 |
| 2021/0045644 A1* | 2/2021 | Kramer | A61N 1/056 |
| 2021/0069468 A1* | 3/2021 | Keating | A61B 17/22 |
| 2021/0121663 A1* | 4/2021 | Marass | A61M 25/0147 |
| 2021/0121669 A1* | 4/2021 | Al Bisher | A61M 27/00 |
| 2021/0220626 A1* | 7/2021 | Sardesai | A61M 25/1011 |
| 2021/0251757 A1* | 8/2021 | Siegel | A61F 2/2466 |
| 2021/0283373 A1* | 9/2021 | Porter | A61M 25/0147 |
| 2021/0402147 A1* | 12/2021 | Enerson | A61M 25/0012 |
| 2022/0023595 A1* | 1/2022 | Bataille | A61M 25/0108 |

* cited by examiner

BRAID AND PULL WIRE CONTAINMENT RING FOR DEFLECTABLE GUIDING CATHETER

CROSS-REFERENCE TO RELATED APPLICATION

The subject application claims the benefit of priority to U.S. Provisional Patent Application Ser. No. 63/043,827, which was filed on Jun. 25, 2020, the contents of which are incorporated by reference herein in its entirety.

BACKGROUND OF THE INVENTION

1. Field of the Invention

The subject invention is directed to surgical instrumentation, and more particularly, to a containment ring for covering the distal end of a reinforcing braid and encapsulating the distal end portion of a pull wire in a deflectable guiding catheter.

2. Description of Related Art

Guiding catheters ("sheaths") are commonly used to introduce balloon catheters and stents into the vascular system (e.g., for percutaneous trans-vascular coronary angioplasty), to introduce cardiac pacing leads into the coronary sinus (e.g., for left ventricular pacing and cardiac resynchronization procedures), or to introduce radiofrequency ablation catheters into the left atrium (e.g., for treatment of atrial fibrillation) into the renal artery for renal denervation procedures.

Guiding sheaths typically come in French sizes ranging from 4 F all the way to 12 F, and in some cases even 18 F or larger. Sheaths generally include an inner lumen that extends from the proximal portion of the device to the distal tip section of the device. The inner lumen often has a polytetrafluoroethylene (PTFE) liner to make the insertion of a device therethrough as easy and as smooth as possible.

Deflectable guiding catheters commonly feature a shaft with at least two sections of various stiffness, whereby the longer proximal section of the shaft is reinforced by a braided sleeve made from stainless steel, and the shorter distal section, which usually is designed to deflect, features a softer durometer section comprising a pull wire connected to an anchor ring located close to the distal tip of the catheter. When the pull wire is activated and pulled, the softer distal section of the catheter sheath deflects in the direction the pull wire is located and pulled.

To improve the kink resistance of the deflectable guiding sheath, the braid reinforcement is usually extended all the way to the proximal end of the pull wire anchor ring. While this type of sheath design is commonly used, it has certain disadvantages. First, during the assembly process, the stainless steel braid needs to be cut and terminated. While this can be done in a controlled process such as tempering the braid with high heat (>350° F.), the braid might expand during the sheath reflow process and expose itself on the shaft surface. Such exposure would create a sharp edge on the surface and make the shaft unusable. Next, having the pull wire anchor ring reflowed into the distal softer sheath tip section might deform or dislodge the anchor ring under extreme pull force. This could deform the softer distal tip section or even cause the pull wire to separate from the anchor ring, making the sheath unusable.

The subject invention presents a solution to these problems by providing a containment ring made from the same or similar material as the braid and anchor ring and positioned it over the cut end of the braid at the proximal end of the anchor ring, thereby covering the cut end of the braid and encapsulating the pull wire between the braid and the anchor ring.

SUMMARY OF THE INVENTION

The subject invention is directed to a new and useful deflectable guiding catheter that overcomes certain problems associated with prior art devices of this type. The device includes a proximal handle assembly, an elongated catheter shaft extending distally from the proximal handle assembly and including a deflectable distal end portion, a drive mechanism within the proximal handle assembly for steering the deflectable distal end portion of the catheter shaft, an anchor ring positioned adjacent a distal end of the catheter shaft, an elongated pull wire extending from the drive mechanism and connected to the anchor ring, and a braided sleeve extending from a proximal end of the catheter shaft to a proximal end of the anchor ring to reinforce the catheter shaft.

A containment ring is positioned over a distal end portion of the braided sleeve at the proximal end of the anchor ring and preferably laser welded to the braided sleeve and the anchor ring, whereby the containment ring covers over the cut distal end of the braided sleeve to prevent exposure of sharp edges and it encapsulates the pull wire between the braided sleeve and the anchor ring to inhibit separation of the pull wire from the anchor ring.

Preferably, the containment ring, the anchor ring and the braided sleeve are made from the same material. For example, the containment ring, the anchor ring and the braided sleeve can be made from stainless steel or a similar material. The elongated catheter shaft includes an inner PTFE liner located radially inward of the braided sleeve, an extruded outer wall surrounding the braided sleeve, and a hydrophobic sheath surrounding the outer wall.

In an exemplary embodiment of the subject invention, the drive mechanism includes a linear drive screw that is mounted for reciprocal axial movement within the interior cavity of the proximal handle assembly, and a rotatable control knob operatively associated with a distal end portion of the proximal handle assembly for moving the linear drive screw. Other drive mechanisms for actuating the pull wire can be employed with the subject invention.

The subject invention is also directed to a method of assembling a deflectable catheter comprising the steps of providing an elongated mandrel, sliding a braided sleeve over the mandrel, gluing the braided sleeve in place with respect to the mandrel, sliding a containment ring over the braided sleeve toward a distal end thereof to act as a cutting guide, cutting the braided sleeve to form a distal ending, and sliding the containment ring over the distal ending of the braided sleeve.

The step of sliding the containment ring over the distal ending of the braided sleeve preferably involves sliding the containment ring to a proximal end of an anchor ring, and the step of sliding the containment ring over the distal ending of the braided sleeve further involves encapsulating a pull wire between the braided sleeve and the anchor ring. The method further includes the step of laser welding the containment ring to the distal end portion of braided sleeve and the proximal end of the anchor ring.

These and other features of the subject invention will become more readily apparent to those having ordinary skill in the art to which the subject invention appertains from the following description of the drawings.

BRIEF DESCRIPTION OF THE DRAWINGS

So that those skilled in the art will readily understand how to make and use the deflectable guiding catheter of the subject invention without undue experimentation, reference may be made to the figures wherein.

ENABLING DESCRIPTION OF THE CLAIMED INVENTION

Figure 1:
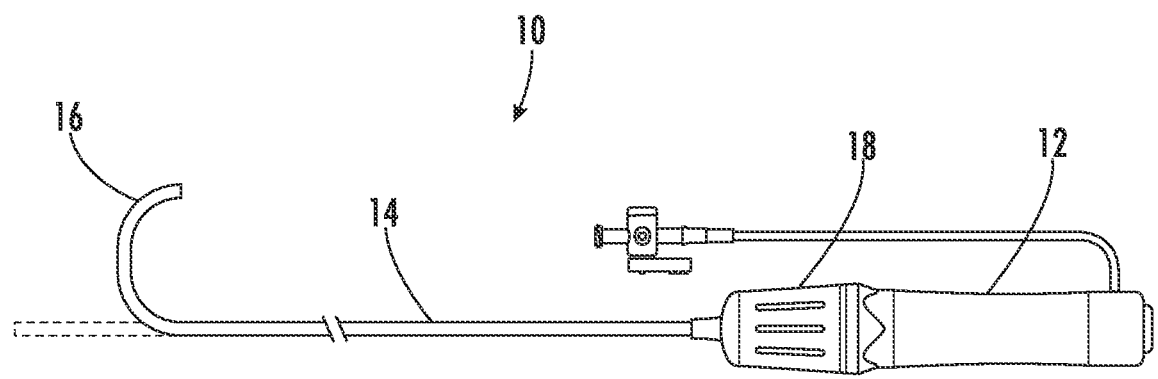
FIG. 1 is side elevation view of a deflectable guiding catheter that incorporates the containment ring feature of the subject invention.

Referring now to the drawings wherein like reference numerals identify similar structural elements and features of the subject invention, there is illustrated in FIG. 1a deflectable guiding catheter 10 that incorporates the novel features of the subject invention. The guiding catheter 10 includes a proximal handle assembly 12, an elongated catheter shaft 14 extending distally from the proximal handle assembly 12 and including a deflectable distal end portion 16.

A drive mechanism (not shown) is located within the proximal handle assembly 12 for steering the deflectable distal end portion 16 of the catheter shaft 14. In an exemplary embodiment of the subject invention, the drive mechanism includes a linear drive screw that is mounted for reciprocal axial movement within the interior cavity of the proximal handle assembly 12, and a rotatable control knob 18 operatively associated with a distal end portion of the proximal handle assembly for moving the linear drive screw. Other drive mechanisms for actuating the pull wire can be employed with the subject invention. Examples of guiding catheters with deflectable distal end portions that include such drive mechanisms are disclosed in commonly assigned U.S. Pat. Nos. 9,498,602; 9,572,957; 9,907,570; and 9,913,684, the disclosures of which are herein incorporated by reference in their entities.

Figure 2:
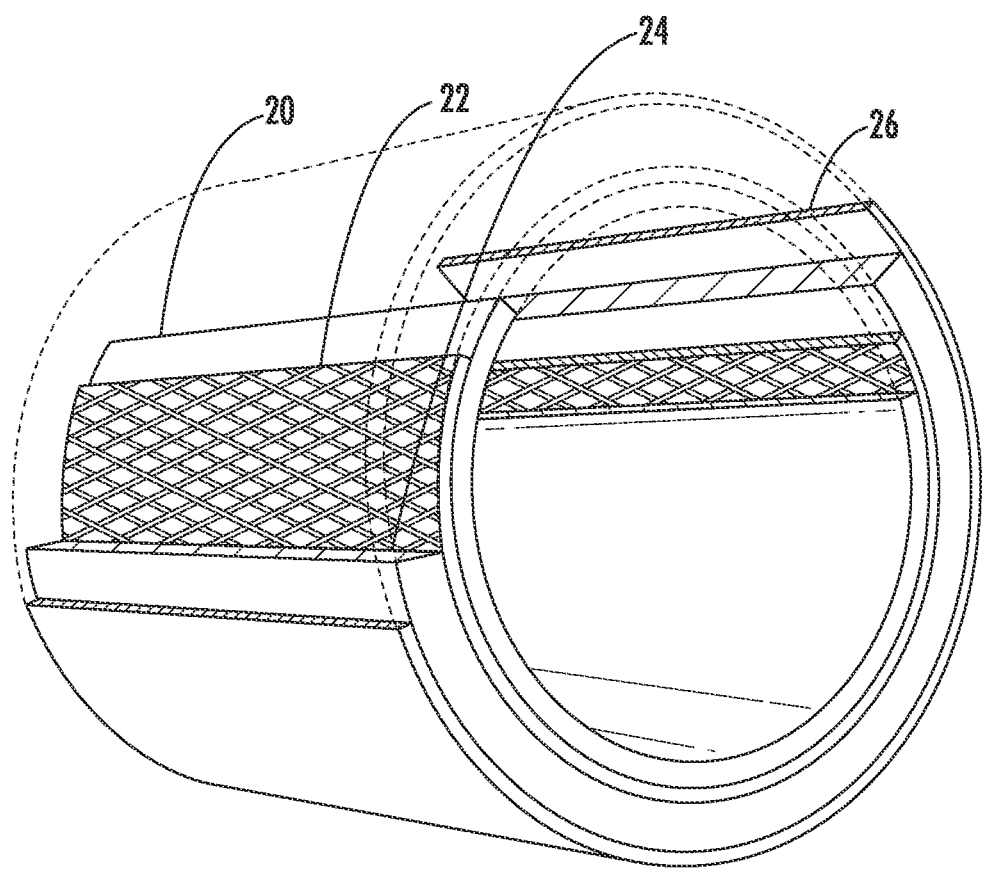
FIG. 2 is an enlarged perspective cross-sectional view of the catheter shaft of the guiding catheter shown in FIG. 1, showing the reinforcing braid that surrounds the inner PTFE liner of the catheter shaft.

As best seen in FIG. 2, the catheter shaft 14 includes an inner PTFE liner 20, a stainless steel braided sleeve 22 surrounding the inner liner 20, an extruded outer wall 24 surrounding the braided sleeve 22, and a hydrophobic sheath 26 surrounding the outer wall 24. The braided sleeve 22 serves to reinforce the shaft 14 and provides torque control and kink resistance, while maintaining flexibility within tortuous anatomy.

Figure 3:
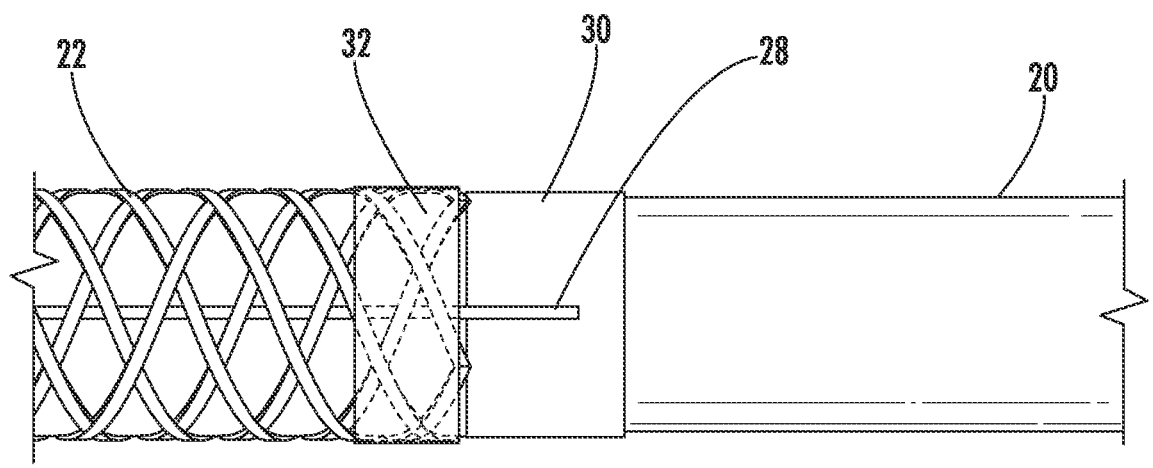
FIG. 3 is a top plan view of a distal end portion of the catheter shaft, with the outer wall removed for ease of illustration.
Figure 4:
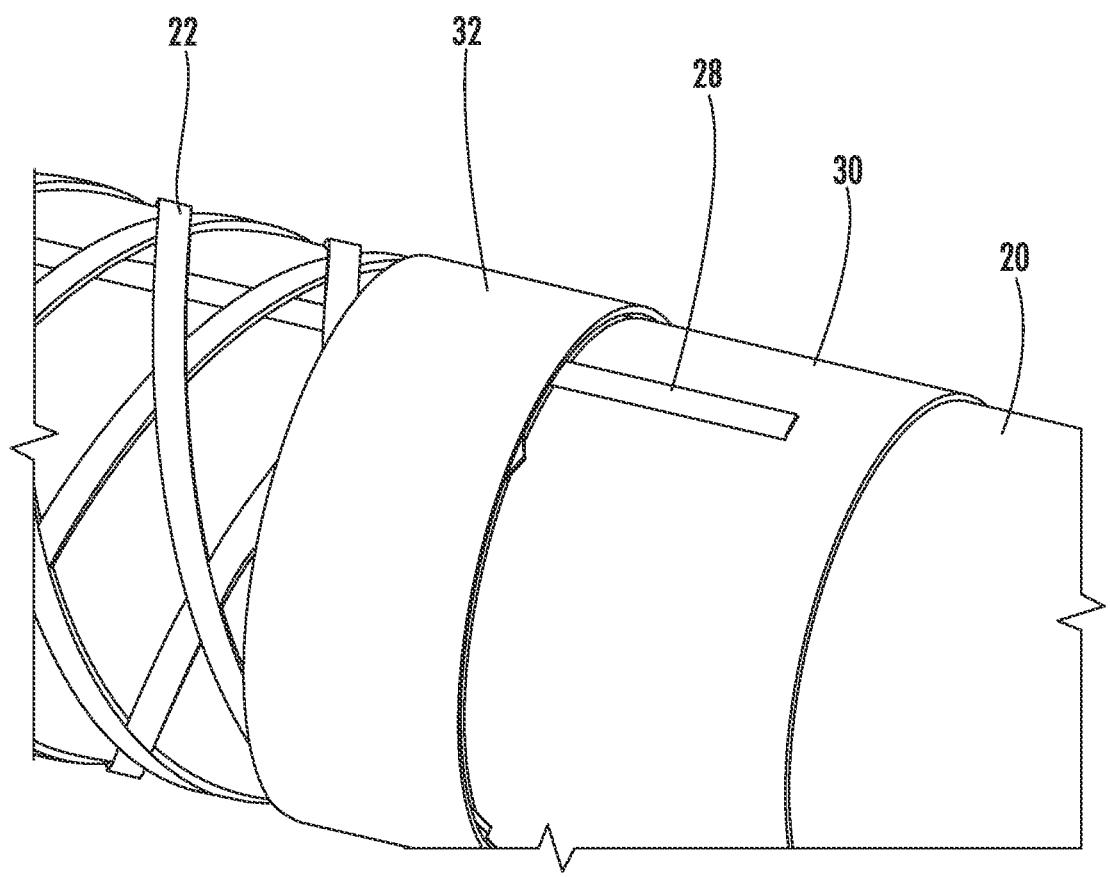
FIG. 4 is a perspective view of the distal end portion of the catheter shaft similar to FIG. 3.
Figure 4A:
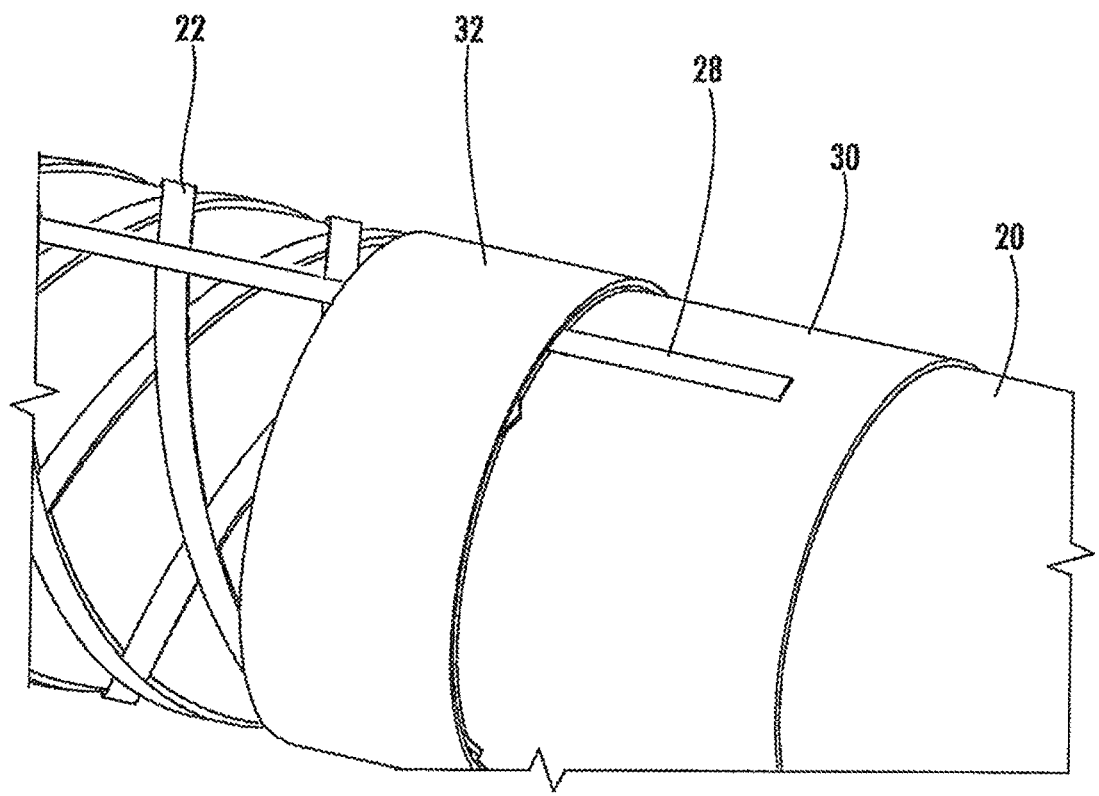
FIG. 4A is a perspective view of the distal end portion of the catheter shaft similar to FIG. 4, but with the pull wire 28 positioned radially between the braided sleeve 22 and the containment ring 32.

Referring now to FIGS. 3, 4 and 4A, a stainless steel anchor ring 30 is positioned adjacent a distal end of the inner liner 20 of the catheter shaft 14, and an elongated pull wire 28 extends from the drive mechanism to the anchor ring 30. Preferably, the pull wire 28 is connected to the anchor ring 30 by laser welding. The pull wire 28 can also be spot welded or glued (e.g. UV adhesive is a preferred gluing process). The braided sleeve 22 extends from a proximal end of the catheter shaft 14 to the proximal end of the anchor ring 30 to reinforce the catheter shaft 14.

A thin walled, stainless steel containment ring 32 is positioned over a cut or terminated distal end portion of the braided sleeve 22 adjacent a proximal end of the anchor ring 30. The containment ring 32 is preferably laser welded to the distal end portion of the braided sleeve 22 and the proximal end of the anchor ring 30. As a result, the containment ring 32 covers over and eliminates any exposed braid ends which can be sharp, and it encapsulates the pull wire 28 between the braided sleeve 22 and the anchor ring 30 to reinforce the connection between the pull wire 28 and the anchor ring 30. More particularly, the containment ring 32 protects the pull wire from extreme angles during deflection, which could cause wire breakage. The containment ring 32 will also prevent the anchor ring 30 from dislodgment by creating a solid seat for the anchor ring 30 and it will prevent the anchor ring 30 from ovaling under heavy deflection loads.

The subject invention is also directed to a method of assembling a deflectable catheter comprising the steps of providing an elongated mandrel, sliding the braided sleeve 22 over the mandrel, gluing the braided sleeve 22 in place with respect to the mandrel, sliding the containment ring 32 over the braided sleeve 22 toward a distal end thereof to act as a cutting guide, cutting the braided sleeve 22 to form a distal ending, and sliding the containment ring 32 over the distal ending of the braided sleeve 22.

The step of sliding the containment ring 32 over the distal ending of the braided sleeve 22 preferably involves sliding the containment ring 32 to the proximal end of the anchor ring 30, and the step of sliding the containment ring 32 over the distal ending of the braided sleeve 22 further involves encapsulating the pull wire 28 between the braided sleeve 22 and the anchor ring 30 (FIG. 4). FIG. 4A shows the pull wire 28 positioned radially between the braided sleeve 22 and the containment ring 32. The method further includes the step of laser welding the containment ring 32 to the braided sleeve 22 and the anchor ring 30.

While the deflectable guiding catheter of the subject disclosure has been shown and described with reference to preferred embodiments, those skilled in the art will readily appreciate that changes and/or modifications may be made thereto without departing from the scope of the subject disclosure.

What is claimed is:

1. A deflectable catheter, comprising:
   a) a proximal handle assembly having an internal cavity;
   b) an elongated catheter shaft extending along a longitudinal axis from the proximal handle assembly to a deflectable distal portion, wherein the catheter shaft has an outer surface and an inner lumen;
   c) a drive mechanism within the proximal handle assembly;
   d) a metallic anchor ring supported on the deflectable distal portion of the catheter shaft, wherein the anchor ring has an outer surface and a proximal end;
   e) an elongated pull wire extending from the drive mechanism and against the outer surface of the catheter shaft to a pull wire distal portion;
   f) a braided sleeve extending from a braided sleeve proximal end residing at or adjacent to a proximal end of the catheter shaft to a braided sleeve distal end portion, wherein the braided sleeve is positioned over and in contact with the pull wire, and the distal end portion of the braided sleeve extends to the proximal end of the anchor ring; and g) a metallic containment ring covering the braided sleeve distal end portion and seated against the proximal end of the anchor ring, h) wherein, with the metallic containment ring contacting the braided sleeve opposite the pull wire contacting the outer surface of the sheath, the metallic containment ring seated against the anchor ring is welded to the braided sleeve and to the metallic anchor ring to thereby hold the pull wire distal portion against the outer surface of the sheath under the braided sleeve, and i) wherein actuation of the drive mechanism causes the pull wire to deflect the deflectable distal portion of the catheter shaft out of alignment with the longitudinal axis.

2. The deflectable catheter of claim 1, wherein the metallic containment ring covers the distal portion of the braided sleeve.

3. The deflectable catheter of claim 1, wherein the metallic anchor ring is made of stainless steel.

4. The deflectable catheter of claim 1, wherein the metallic containment ring is a stainless steel band.

5. The deflectable catheter of claim 1, wherein the braided sleeve includes stainless steel strands.

6. The deflectable catheter of claim 1, wherein the weld connecting the distal end of the metallic containment ring to the braided sleeve and to the proximal end of the metallic anchor ring is a laser weld.

7. The deflectable catheter of claim 1, wherein the elongated catheter shaft includes an inner PTFE liner located radially inward of the braided sleeve, an extruded outer wall surrounding the braided sleeve, and a hydrophobic sheath surrounding the extruded outer wall.

8. The deflectable catheter of claim 1, wherein the pull wire distal portion is connected to the outer surface of the anchor ring.

9. The deflectable catheter of claim 1, wherein the drive mechanism includes a linear drive screw that is connected to the pull wire and mounted for reciprocal axial movement within the interior cavity of the proximal handle assembly for actuating the pull wire.

10. The deflectable catheter of claim 9, further comprising a rotatable control knob operatively associated with the proximal handle assembly for moving the linear drive screw to actuate the pull wire.

11. The deflectable catheter of claim 1, wherein the elongated pull wire is partially covered by the metallic containment ring and partially uncovered.

12. The deflectable catheter of claim 1, wherein the metallic containment ring and the metallic anchor ring do not overlap.

13. A deflectable catheter, comprising:
a) a proximal handle assembly having an internal cavity;
b) an elongated catheter shaft extending along a longitudinal axis from the proximal handle assembly to a deflectable distal portion, wherein the catheter shaft has an outer surface and an inner lumen;
c) a drive mechanism within the proximal handle assembly;
d) a stainless steel anchor ring supported on the deflectable distal portion of the catheter shaft, wherein the anchor ring has an outer surface and a proximal end;

e) an elongated pull wire extending from the drive mechanism and against the outer surface of the catheter shaft to a pull wire distal portion;

f) a braided sleeve extending from a braided sleeve proximal end residing at or adjacent to a proximal end of the catheter shaft to a braided sleeve distal end portion, wherein the braided sleeve is positioned over and in contact with the pull wire, and the distal end portion of the braided sleeve extends to the proximal end of the stainless steel anchor ring; and g) a metallic containment ring having a containment ring distal end, wherein the containment ring covers the braided sleeve distal end portion and is seated against the proximal end of the anchor ring;

h) wherein, with the metallic containment ring contacting the braided sleeve opposite the pull wire contacting the outer surface of the sheath, the distal end of the metallic containment ring seated against the anchor ring is welded to the braided sleeve and to the proximal end of the stainless steel anchor ring to thereby hold the pull wire distal portion against the outer surface of the sheath under the braided sleeve, and i) wherein actuation of the drive mechanism causes the pull wire to deflect the deflectable distal portion of the catheter shaft out of alignment with the longitudinal axis.

14. The deflectable catheter of claim 13, wherein the elongated catheter shaft includes an inner PTFE liner located radially inward of the braided sleeve, an extruded outer wall surrounding the braided sleeve, and a hydrophobic sheath surrounding the extruded outer wall.

15. The deflectable catheter of claim 13, wherein the drive mechanism includes a linear drive screw that is connected to the pull wire and mounted for reciprocal axial movement within the interior cavity of the proximal handle assembly for actuating the pull wire.

16. The deflectable catheter of claim 13, further comprising a rotatable control knob operatively associated with the proximal handle assembly for moving the linear drive screw to actuate the pull wire.

17. The deflectable catheter of claim 13, wherein the distal end of the metallic containment ring and the proximal end of the stainless steel anchor ring do not overlap.

18. The deflectable catheter of claim 13, wherein the pull wire distal portion is connected to the outer surface of the anchor ring.

19. A deflectable catheter, comprising:
a) a proximal handle assembly having an internal cavity;
b) an elongated catheter shaft extending along a longitudinal axis from the proximal handle assembly to a deflectable distal portion, wherein the catheter shaft includes an outer surface and an inner PTFE liner located radially inwardly of the braided sleeve and surrounding an inner lumen through the catheter shaft;
c) a drive mechanism within the proximal handle assembly for steering the deflectable distal portion of the catheter shaft;
d) a stainless steel anchor ring supported on the deflectable distal portion of the catheter shaft, wherein the anchor ring has an outer surface and a proximal end;
e) an elongated pull wire extending from the drive mechanism and against the outer surface of the catheter shaft to a pull wire distal portion welded or attached by an adhesive to the outer surface of the stainless steel anchor ring;
f) a braided sleeve extending from a braided sleeve proximal end residing at or adjacent to a proximal end of the catheter shaft to a braided sleeve distal end portion, wherein the braided sleeve is positioned over and in contact with the pull wire, and the distal end portion of the braided sleeve extends to the proximal end of the stainless steel anchor ring; and g) a metallic containment ring covering the braided sleeve distal end portion and seated against the proximal end of the anchor ring, h) wherein, with the metallic containment ring contacting the braided sleeve opposite the pull wire contacting the outer surface of the sheath, the distal end of the metallic containment ring seated against the anchor ring is welded to the braided sleeve and to the proximal end of the stainless steel anchor ring to thereby hold the pull wire distal portion against the outer surface of the sheath under the braided sleeve, and i) wherein actuation of the drive mechanism causes the pull wire to deflect the deflectable distal portion of the catheter shaft out of alignment with the longitudinal axis.

20. The deflectable catheter of claim 19, wherein the distal end of the metallic containment ring and the proximal end of the stainless steel anchor ring do not overlap.

* * * * *